United States Patent [19]

Groby

[11] 4,063,977

[45] Dec. 20, 1977

[54] PROCESS FOR WELDING TOGETHER A COVER AND A VESSEL OF THERMOPLASTIC MATERIAL, AND COVER INTENDED FOR USE IN THE PROCESS

[75] Inventor: Chester Groby, Nol, Sweden

[73] Assignee: Aktiebolaget Tudor, Sundbyberg, Sweden

[21] Appl. No.: 713,898

[22] Filed: Aug. 12, 1976

[30] Foreign Application Priority Data

Aug. 15, 1975 Sweden ............................... 7509151

[51] Int. Cl.² ............................................. B29C 27/02
[52] U.S. Cl. ..................................... 156/69; 156/304; 156/306; 156/499; 215/232; 220/359
[58] Field of Search ................ 156/69, 306, 499, 304; 215/232, 233; 220/359; 136/175

[56] References Cited

U.S. PATENT DOCUMENTS

| | | | |
|---|---|---|---|
| 2,387,566 | 10/1945 | Custers | 156/499 |
| 3,053,726 | 9/1962 | Larson et al. | 156/304 |
| 3,799,820 | 3/1974 | Sollerud | 156/69 |

Primary Examiner—Edward G. Whitby
Attorney, Agent, or Firm—Burns, Doane, Swecker & Mathis

[57] ABSTRACT

The edge of a cover is welded to the edge of a vessel by disposing a multi-section, separable welding tool therebetween so that substantially the entire vessel opening is uncovered. The edges are heated by the welding tool. Thereafter, the edges and tool are separated to allow the sections of the tool to be separated without passing across the vessel opening. Then the edges are joined together. The cover can include a depending lip which bears against an inside wall of the vessel during the heating, displacing and joining steps to maintain proper alignment between the cover and the vessel.

6 Claims, 4 Drawing Figures

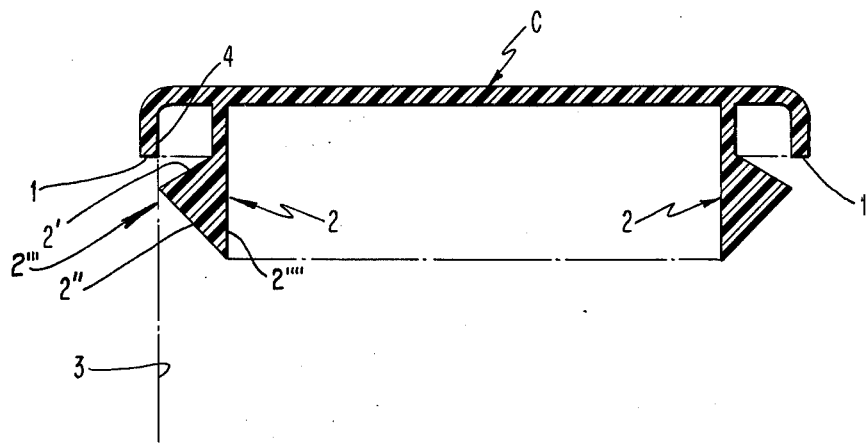
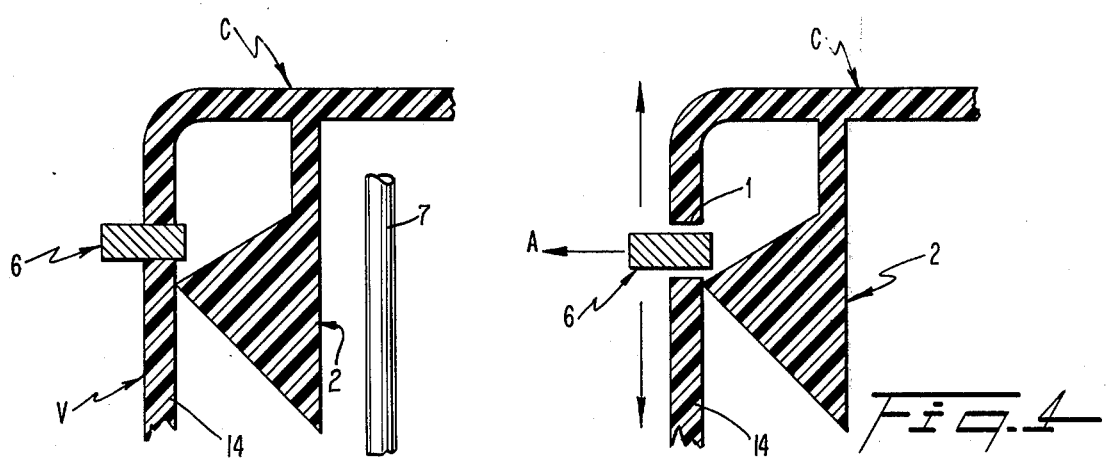

PROCESS FOR WELDING TOGETHER A COVER AND A VESSEL OF THERMOPLASTIC MATERIAL, AND COVER INTENDED FOR USE IN THE PROCESS

BACKGROUND AND OBJECTS

The present invention concerns a process for welding together a cover and vessel of thermoplastic material. The invention relates also to a cover, for application of the process. The process is especially suitable for covers and vessels of substantially rectangular configuration and is especially advantageous when either or both of the objects that are to be welded together present protrusions that project up or down from the vessel or cover, i.e., that pass through the surface that is defined by the edges that are to be joined.

Hot plate welding, i.e., heating against a heated metallic plate, is a method frequently used for joining a cover and vessel of thermoplastic material. Basically, the edges to be joined are heated to a molten state by the plate and then joined together. An important field of application for this method is the fastening of a cover on a cell vessel for electric storage batteries. The invention is especially suited for use in such a situation.

Formerly in hot tool welding, welding plates were used that covered and heated the whole surface defined and bordered by the edges against which the joining was to occur. This led to relatively large plates, for which considerable amounts of heat were used in heating them. Another drawback is that when the heating of the vessel edges is completed, the welding tool has to be removed by a relatively long time consuming operation motion. Another disadvantage of known methods is that there have to be concavities in the tool, corresponding to any parts or protrusions of the vessel and cover that extend upward or downward. This has the result that a specific welding tool can be used only for joining a cover and vessel with a specific, corresponding configuration, so that a shift to different types of vessel and cover is unnecessarily demanding in terms of cost and labor.

By means of the process of the present invention, there is a substantial shortening of the time for removal of the welding tool from vessel and cover after completion of the heating. In this way, there is better control of the temperature of the material surfaces at the moment of joining, whereby the quality of the obtained join can be improved. It is important for battery cells, for instance, to have a wholly tight weld. The process of the invention offers also considerably greater flexibility in the types of devices used for its execution.

BRIEF DESCRIPTION

The process of the invention is characterized in that the edges of the cover and vessel that are to be welded together are heated against a tool that preferably comprises a substantially rectangular frame. The configuration may be adapted, however, to the particular form of the objects being joined. The tool is such that it leaves substantially the whole vessel opening free. Moreover, the tool is divided so that after the heating is completed the cover and vessel are removed a short distance from the tool, which thereafter is removed from the heating position without passing across the vessel opening.

This has the effect that in shaping the tool, no consideration has to be taken of details or protrusions other than precisely those edges that are to be joined. This is especially advantageous for instance in certain types of lead storage batteries where the cover is welded onto the cell vessel after the electrode sets have been placed therein. The electrode sets comprise also pole posts which may be of considerable length, so that use of earlier welding methods would be entirely impossible. By means of the invention, use can suitably be made of a cover that has on the one hand an outer edge intended to be welded to a vessel, and a lip located therein that extends downward. Advantageously, the depending lip extends downward and outward so that it at least approaches a verticle plane through the inner limiting line of the outer edge. With such a cover, a special method can be used whereby during the whole course of heating and the moment that follows it, the downward extending edge of the cover bears on the interior of the vessel wall. Hereby, it is made possible to get a very precise engagement of the cover on the vessel.

THE DRAWING

A preferred embodiment of the invention is depicted in the accompanying drawing in which:

FIG. 1 is a cross-sectional view of a novel cover for use in the novel process of the present invention;

FIG. 2 is a plan view of a welding tool for use in the process of the present invention;

FIGS. 3 and 4 are fragmentary cross-sectional views of a cover, vessel, and welding tool during two phases of the welding process according to the invention.

DETAILED DESCRIPTION

A section of a cover C intended for the process is shown in FIG. 1. The cover has an outer edge 1 intended to be fixed on a vessel. Inside this, there has a surface 2' a depending lip 2 that extends downward beyond the edge 1 and is directed downward and outward so that a point thereof approaches a vertical plane 3 through the internal limiting line 4 of the outer edge. The lip thereafter continues downward with a conical lower surface 2'' whereby application of the cover on the vessel is facilitated. There is thus defined by surfaces 2', 2'' a projection 2''' which extends outwardly toward the plane 3. The lips also include laterally spaced internal wall sections 2''''.

The welding tool 6 is depicted schematically in FIG. 2. It comprises a pair of sections 6A, 6B that are divided along an edge 8, and defining an open interior 9. Conventional means can be attached to the tool 6 for heating the latter. The sections 6A, 6B are separable in directions indicated by the arrows 10, 12. The tool is designed so that when placed upon the vessel, it can contact the edge of the vessel, while leaving the opening, i.e., inner space of the vessel free, or uncovered.

The welding process is depicted schematically in FIGS. 2 and 3. The cover C and the vessel V of thermoplastic material are brought together so that the depending lip 2 of the cover engages an inside wall 14 of the vessel, with the welding tool 6 disposed between and engaging the edges of the cover and the vessel. After the edges of the cover and the vessel have been heated sufficiently, the cover and vessel are separated relative to the welding tool 6, as depicted in FIG. 4. This can be accomplished by lowering the vessel and then lowering the tool. Alignment between the cover and vessel is maintained due to the continuing contact of the depending lip 2 against the inside wall of the vessel.

Thereafter the tool sections 6A, 6B are separated (see arrow A in FIG. 4). Since the tool does not pass across the opening of the vessel, there is no need to be concerned about protrusions which may be projecting from the vessel or cover. As noted earlier, such a protrusion can comprise a pole post 7 carried by the vessel. This greatly facilitates the manufacture of the welding tool.

Once the tool 6 is removed from between the cover and the vessel, these parts are merged and joined together to complete the union. This mergence is facilitated by the continuing contact between the lip 2 and the inside wall of the vessel.

As a result of this invention, the welding process can be accomplished more rapidly with more simplified welding tool configurations. Moreover, less heat is required to heat the welding tool which is now of limited mass.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A process for welding together the edges of a cover and a vessel, the vessel carrying protrusions which project beyond the upper edge of the vessel, said process comprising the steps of:
    providing a vessel having an upper edge and carrying upwardly extending protrusions which project beyond the vessel edge;
    providing a cover having a lower edge alignable with the vessel upper edge;
    aligning the edges of the vessel and the cover;
    disposing a welding tool comprising separable sections between the edges of the cover and vessel so that substantially the whole vessel opening is left free and said protrusions are spaced from the tool sections;
    heating the welding tool to heat the edges of the cover and the vessel;
    separating the edges and the tool by a short distance;
    separating the welding tool sections in different directions without passing across the vessel opening so as to avoid the protrusions; and
    thereafter joining the edges of the cover and the vessel together.

2. A process according to claim 1 wherein the cover includes a depending lip, said process further including the step of maintaining said lip in engagement with an inside wall of the vessel during said heating, separating and joining steps.

3. A thermoplastic cover for use in a process of welding an edge of the cover to an edge of a thermoplastic vessel which includes an inside wall, said cover comprising a depending lip extending beyond the edge of the cover, said lip including laterally spaced internal wall sections and an outwardly extending projection disposed opposite said internal wall sections, said projection being arranged to engage the inside wall of the vessel to maintain proper alignment therebetween as the cover edge and vessel edge are moved relative to one another.

4. A process for aligning and welding together the edges of a cover and a vessel, comprising the steps of:
    providing a vessel having an upper edge defining an opening therebetween;
    providing a cover comprising a lower edge alignable with the vessel upper edge, and a downwardly extending lip having laterally spaced internal wall sections and an outwardly extending projection disposed opposite said internal wall sections;
    disposing a multi-section separable welding tool between the edges of the cover and vessel so that substantially the whole vessel opening is left free;
    following said disposing step, merging the cover and the vessel together so that the lip enters the vessel opening and the projection engages an inside wall of the vessel to align the cover edge with the vessel edge;
    heating the welding tool to heat the edges of the cover and the vessel;
    separating the edges and the tool by a short distance while maintaining the projection in engagement with the vessel inside wall;
    separating the welding tool sections without passing across the vessel opening; and
    thereafter joining the edges of the cover and the vessel together while maintaining the projection in engagement with the vessel inside wall.

5. A cover according to claim 3 wherein said projection is formed by outwardly coverging surfaces, a lowermost one of said surfaces extending upwardly at an angle relative to horizontal.

6. A covering according to claim 5 wherein said coverging surfaces converge at least to a point lying on a vertical plane defined by the inner limiting line of the edge of the cover.

* * * * *